United States Patent
Jones

[15] 3,707,043
[45] Dec. 26, 1972

[54] ALIGNMENT ASSEMBLY

[72] Inventor: David P. Jones, 3160 Second Avenue, Detroit, Mich. 48201

[22] Filed: Jan. 12, 1970

[21] Appl. No.: 2,295

[52] U.S. Cl. ................... 33/185 R, 33/1 N, 33/79 R, 33/172 B
[51] Int. Cl. ............................................. B27g 23/00
[58] Field of Search ......... 33/174 Q, 84, 215 B, 79 R, 33/185 R, 172 B, 169 C, 215 B, 1 N; 408/16, 112

[56] References Cited

UNITED STATES PATENTS

| | | | |
|---|---|---|---|
| 3,254,416 | 6/1966 | Eisele | 33/174 Q |
| 2,846,970 | 8/1958 | Dupree | 116/129 |
| 2,898,880 | 8/1959 | Newton | 116/129 |
| 1,270,178 | 6/1918 | Lehtinen | 33/215 B |
| 1,883,655 | 10/1932 | Eskilson | 33/215 B |
| 2,700,224 | 1/1955 | Johnson | 33/174 Q |
| 2,628,512 | 2/1953 | Lankford | 408/112 X |
| 3,242,773 | 3/1966 | Van Praag | 408/16 |
| 2,677,193 | 5/1954 | Truppe | 33/215 B |

FOREIGN PATENTS OR APPLICATIONS

| | | | |
|---|---|---|---|
| 466,002 | 9/1928 | Germany | 33/169 C |
| 136,856 | 12/1919 | Great Britain | 33/215 B |

*Primary Examiner*—Robert B. Hul
*Attorney*—McGlynn, Reising, Milton & Ethington

[57] ABSTRACT

An alignment assembly for indicating the angle of incidence with respect to a workpiece including attachment means adapted to be attached to a device such as a portable hand drill. The assembly includes a central shaft interconnecting two balls. The ball at one end supports an input member for pivotal movement about the center of the ball while the ball at the other end supports an indicator member for pivotal movement about the center thereof. Three rods engage and interconnect the input member and the indicator member so that the indicator member pivots in response to pivotal movement of the input member. A female socket member having a spherical cavity supports the indicator member and a translucent dome is attached to the female member. A circular groove is disposed on the interior surface of the dome and a second circular groove is disposed on the spherical surface of the indicator member with the two circles being of equal diameter so that when they are in registry or concentric with one another the longitudinal axis of the assembly is perpendicular to a workpiece engaged by the input member.

23 Claims, 7 Drawing Figures

PATENTED DEC 26 1972
3,707,043
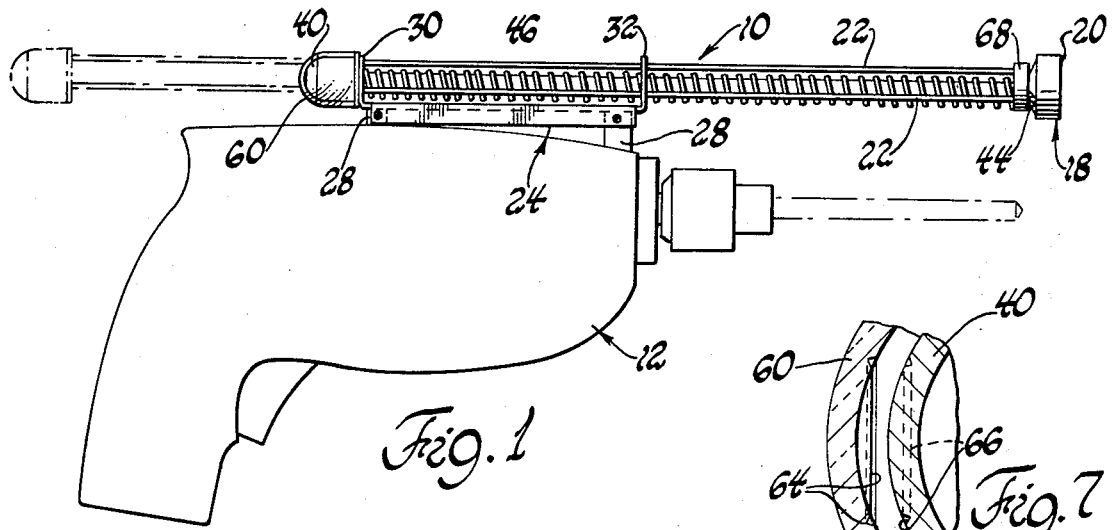
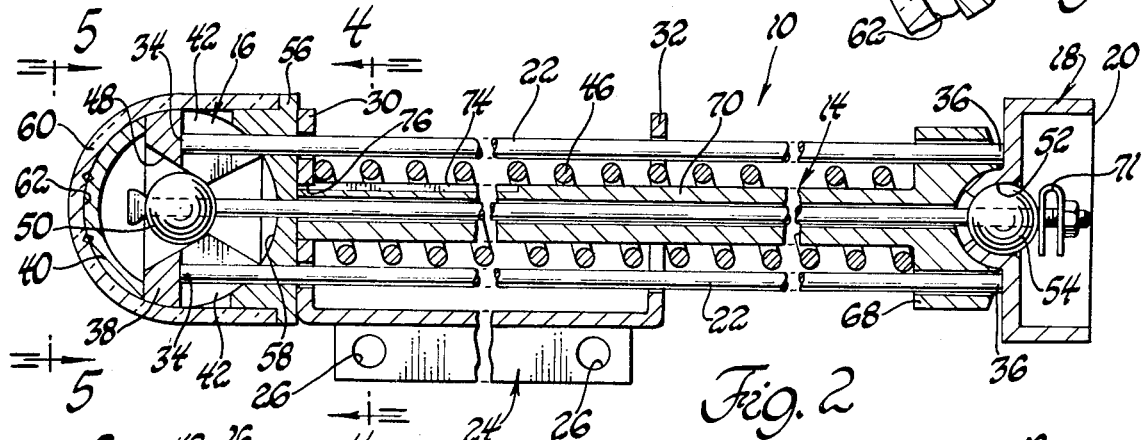
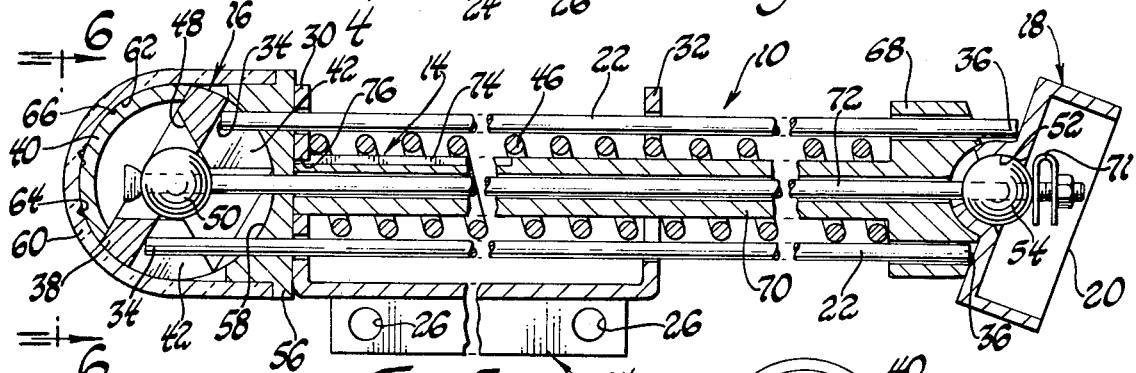
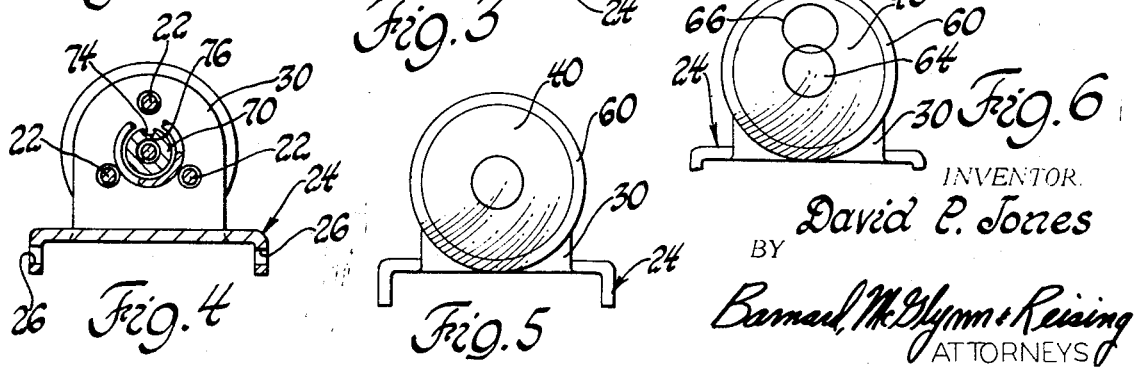
INVENTOR.
David P. Jones
BY
Barnard, McGlynn & Reising
ATTORNEYS

ALIGNMENT ASSEMBLY

This invention relates to an alignment assembly for indicating the angle of incidence with respect to a workpiece. More specifically, the assembly has a longitudinal axis and indicates when the longitudinal axis is perpendicular to a workpiece.

Although the alignment assembly of the instant invention may be utilized in various environments, it is particularly suited for use with a portable electric hand drill. In utilizing a drill press to drill a hole in a workpiece, it is quite easy to drill a hole which is perpendicular to a surface of the workpiece. When using a portable hand drill, however, it is quite difficult to drill perpendicular holes into a workpiece.

There are prior art alignment assemblies adapted for attachment to a portable drill for indicating when the drill is perpendicular to a surface of a workpiece. Examples of such prior art assemblies are shown in U.S. Pat. Nos. 2,407,845; 2,670,638 and 2,909,085. One of the problems associated with the prior art assemblies is that the indicator means is frequently adjacent the workpiece and therefore difficult to view. Another problem is that the indicator means frequently obtains its movement from a point closely adjacent the workpiece so that the misalignment indication differs depending upon the position from which it is viewed, i.e., there is a parallax problem.

Accordingly, it is an object and feature of this invention to provide an improved alignment assembly having a longitudinal axis for indicating the angle of incidence with respect to a workpiece which includes support means, indicator means supported by the support means for universal type pivotal movement about a first point, input means adapted through surface means defining a plane to engage a workpiece supported by the support means for universal type pivotal movement about a second point which is spaced along said axis from the first point, and motion transmitting means for pivoting the indicator means about the first point in response to pivotal movement of the input means about the second point.

Other objects and attendant advantages of the present invention will be readily appreciated as the same becomes better understood by reference to the following detailed description when considered in connection with the accompanying drawings wherein:

FIG. 1 is a side elevational view of a preferred embodiment of the instant invention in combination with a portable hand drill;

FIG. 2 is an enlarged fragmentary cross sectional view of the preferred embodiment of the instant invention shown in the position in which its longitudinal axis is perpendicular to a workpiece;

FIG. 3 is an enlarged fragmentary cross sectional view similar to FIG. 2 but showing the assembly in the position in which its longitudinal axis is disposed at an angle other than 90° relative to a workpiece;

FIG. 4 is a cross sectional view taken substantially along line 4—4 of FIG. 2;

FIG. 5 is a view taken substantially along line 5—5 of FIG. 2;

FIG. 6 is a view taken substantially along line 6—6 of FIG. 3; and

FIG. 7 is an enlarged cross sectional fragmentary view of the indicator means and the adjacent dome-like translucent member slightly separated to show the circular grooves therein which respectively act as indicia means.

Referring now to the drawings wherein like numerals indicate like or corresponding parts throughout the several views, a preferred embodiment of the alignment assembly of the instant invention is generally shown at 10. In FIG. 1 the alignment assembly 10 is shown attached to a portable hand drill generally indicated at 12. The alignment assembly 10 indicates the angle of incidence with respect to the surface of a workpiece so that when combined with a portable drill such as that indicated in FIG. 1, an indication will be provided so that the drill can be maintained perpendicular to a workpiece.

The alignment assembly 10 includes a support means generally indicated at 14. Also included is an indicator means generally indicated at 16 and supported by the support means 14 for universal type pivotal movement about a first point. An input means generally indicated at 18 is adapted by a front annular face or surface means 20 to engage a workpiece and is supported by the support means 14 for universal type pivotal movement about a second point which is spaced from the first point about which the indicator means 16 pivots. The surface means 20 defines a plane which is transverse at various angles to the longitudinal axis of the assembly as indicated in FIGS. 2 and 3. There is also included motion transmitting means comprising the three motion transmitting elements or rods 22 for pivoting the indicator means 16 about the first point in response to pivotal movement of the input means 18 about the second point. The pivotal movement of the input means 18 can result from engagement of the surface means 20 with a workpiece and movement thereof relative to the longitudinal axis as when the longitudinal axis is moved into and out of perpendicular relationship with the plane defined by the surface means 20. Also included is the attachment means generally indicated at 24. The attachment means 24 is adapted to be connected to a device such as the portable drill 12 and movably supports the support means 14 for allowing the support means 14, as well as the input means 18 and the indicator means 16, to move longitudinally relative thereto.

The attachment means 24 comprises a bracket having holes 26 therethrough so that fastening elements may extend therethrough to be secured to a device, as illustrated the fastening elements are secured to the lugs 28 on the hand drill 12 as indicated in FIG. 1. The bracket defining the attachment means includes first and second upstanding spaced and parallel flanges 30 and 32 respectively. The rods 22 extend through the flanges 30 and 32. Both of the flanges 30 and 32 have separate holes therethrough for each of the rods 22, however the rod holes in the flange 32 are tangent to a larger hole which accommodates the support means 14. The first ends 34 of the rods 22 engage the indicator means 16 and are equally spaced about the first point about which the indicator means 16 pivots. In a similar manner, the second ends 36 of the rods 22 engage the input means 18 and are equally spaced about the second point about which the input means 18 pivots. In other words, the rods 22 are spaced 120° apart about the longitudinal axis of the assembly 10.

The indicator means 16 is defined by the members 38 and 40 which together form a generally spherical or ball shape. The member 38 has three recesses 42 therein for receiving and in which are disposed the first ends 34 of the rods 22. The input means 18 comprises a unitary member and although not shown may also have three equally spaced recesses for receiving the second ends 36 of the rods 22.

The support means 14 and the rods 22 are movable relative to the flanges 30 and 32 of the attachment means 24 between a first position illustrated in full lines in FIG. 1 and a second position illustrated in phantom in FIG. 1. There is included a biasing means comprising the spring 46 which reacts between the flange 30 of the attachment means 24 and the support means 14 for urging the latter to the first position, which is illustrated in FIGS. 1, 2 and 3.

The member 38 of the indicator means 16 includes a first socket 48. The support means 14 includes an at least partially spherical first element comprising the ball 50. The ball 50 is disposed in the first socket 48 and the center of the ball 50 is the same as or coincident with the first point about which the indicator means 16 pivots.

The input means or member 18 includes a second socket 52. The support means 14 further includes an at least partially spherical second element comprising the ball 54 which is disposed in the second socket 52. The ball 54 has a center which is the same as or coincident with the second point about which the input member 18 pivots.

The support means 18 further includes a female member 56 which has a spherical concave cavity 58 therein. The member 38 of the indicator means 16 has a spherical surface in sliding engagement with the concave cavity 58. Also, the female member 56 has passages extending therethrough and each of the rods 22 extends through one of the passages in the female member 56 to engage the member 38.

A translucent means or member 60 is attached to the female member 56. The translucent or transparent member 60 is dome-shaped in that it has a semi-spherical end portion. The translucent member 60 has a concave spherical surface 62 which is disposed about the convex spherical member 40 of the indicator means 16. As shown in FIG. 7, there is included a first indicia means comprising a circular groove 64 in the concave spherical surface 62 of the translucent member 60. Still referring to FIG. 7, the member 40 of the indicator means 16 includes a second indicia means comprising the circular groove 66. The circular groove 66 is disposed closely adjacent and perhaps in sliding contact with the spherical surface 62 of the translucent member 60 for coacting with the circular groove 64 to indicate the angle of incidence or perpendicular relationship of the longitudinal axis of the assembly 10 with respect to a workpiece. The circular grooves 64 and 66 are of equal diameters. It will be noted that the concave spherical surface 62 has a center which coincides with the center of the ball 50 which is the same as the first point about which the indicator means 16 pivots.

The support means 14 further includes a guide member comprising a head portion 68 and an elongated portion 70. The head portion 68 of the guide member abuts the input member 18 and the spring 46 reacts between the flange 30 of the attachment means 24 and the head portion 68 of the guide member. The rods 22 pass through holes in the head portion 68 of the guide member. The spring 46 engages a first side of the flange 30 at one end thereof and extends through the second flange 32 and engages the head portion 68 of the guide member at the other end to urge the female member 56 against the second side of the first flange 30. The elongated portion 70 of the guide member extends through the parallel and spaced flanges 30 and 32 and engages the female member 56. The spring 46 is disposed about the elongated portion 70 of the guide member.

The support means 14 further includes a shaft or tie rod 72 interconnecting the firs and second balls 50 and 54 and extends through the head portion 68 and elongated portion 70 of the guide members. The shaft 72 extends through the balls 50 and 54 and has a head on one end engaging the ball 50 and a nut threadedly attached to the other end. A spring 71 reacts between the nut and the ball 54. The input member 18 and the head 68 of the guide member are in mating engagement through coacting spherical surfaces and the shaft 72, the spring 71 and the balls 50 and 54 maintain the input member 18 in sliding engagement with the head portion 68 of the guide member as well as maintaining the member 38 of the indicator means 16 in sliding engagement with the concave spherical cavity 58.

There is also included positioning means interconnecting the elongated portion 70 of the guide member and the first flange 30 for preventing rotation of the guide member. More specifically, the positioning means comprises a slot or groove 74 in the elongated portion 70 of the guide member and a tab 76 extending from the first flange 30 and into the slot 74. As the assembly is moved between the position illustrated in full lines in FIG. 1 and the position illustrated in phantom in FIG. 1, the tab 76 moves along the slot 74.

In operation, the alignment assembly 10 is attached to a device such as the portable hand drill 12. The longitudinal axis of the assembly 10 passes through the centers of the balls 50 and 54 and is aligned with the axis of the drill when the attachment means 24 is secured to the drill 12. The flat surface 20 of the input member 18 is placed against the flat surface of a workpiece and the hand drill 12 manipulated until the circular grooves 64 and 66 overlap one another as shown in FIG. 5 so that there appears to be only one circle. In this position, the longitudinal axis of the alignment assembly 10 is perpendicular to the workpiece and the axis of the drill is perpendicular to the workpiece. As the drill enters the workpiece in drilling a hole, the circular grooves 64 and 66 are maintained in registry and in a concentric relationship as shown in FIG. 5 to maintain the drill perpendicular to the surface of the workpiece. As the drill enters the workpiece to form a hole therein, the input member 18 reacts against the head portion 68 of the guide member to move the elongated portion 70 thereof rearwardly against the biasing action of the spring 46 through the flanges 30 nd 32. During this movement, the female member 56 moves rearwardly away from the first flange 30 to the position illustrated in phantom in FIG. 1. Also, during this movement the rods 22 move rearwardly through the first and second flanges 30 and 32. The coaction between the tab 76 and the slot 74 prevents rotation of the guide member. In the event the longitudinal axis of the assembly is not perpendicular to the workpiece, the input member 18 will be pivoted to a position similar to that shown in FIG. 3 so that the circular grooves 64 and 66 are not concentric as illustrated in FIG. 6.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An alignment assembly for indicating the angle of incidence with respect to the planar surface of a workpiece, said assembly comprising; support means, indicator means supported by said support means for universal type pivotal movement about a first point, input means adapted to engage a workpiece and supported by said support means for universal type pivotal movement about a second point which is spaced from said first point said assembly having a longitudinal axis, said first and second points being disposed on said axis, said input means including surface means defining a plane for engaging said planar surface of the workpiece and of substantial breadth whereby to assume in response to said engagement a conforming relation to said planar surface, said plane being transverse to said axis, and movable with said pivotal movement to various angles relative thereto, and motion transmitting means for pivoting said indicator means about said first point in response to pivotal movement of said input means about said second point resulting from engagement of said surface means with a workpiece and movement thereof relative to said longitudinal axis as when said longitudinal axis is moved into and out of perpendicular relationship with said plane.

2. An assembly as set forth in claim 1 including attachment means operatively connected to said support means and adapted for attachment to a device.

3. An assembly as set forth in claim 1 including translucent means attached to said support means, said translucent means having a concave spherical surface disposed about said indicator means, first indicia means on said spherical surface, said indicator means including second indicia means adjacent said spherical surface for coacting with said first indicia means to indicate said angle of incidence.

4. An assembly as set forth in claim 3 wherein said first point is the center of said spherical surface.

5. An assembly as set forth in claim 1 including attachment means adapted to be connected to a device and movably supporting said support means and guiding said support means and at least said input means in translative movement relative thereto whereby the device may move toward and away from the workpiece.

6. An assembly as set forth in claim 1 wherein said motion transmitting means includes at least three motion transmitting elements with first ends thereof equally spaced about said first point and engaging said indicator means and with second ends thereof equally spaced about said second point and engaging said input means.

7. An assembly as set forth in claim 6 including attachment means adapted to be connected to a device and translatively movably supporting said support means and said motion transmitting elements whereby the device may move toward and away from the workpiece.

8. An assembly as set forth in claim 7 wherein each of said motion transmitting elements comprise a rod, said rods being equally spaced about said longitudinal axis.

9. An assembly as set forth in claim 8 including translucent means attached to said support means, said translucent means having a concave spherical surface disposed about said indicator means, first indicia means on said spherical surface, said indicator means including second indicia means adjacent said spherical surface for coacting with said first indicia means to indicate said angle of incidence.

10. An assembly as set forth in claim 9 wherein said first point is the center of said spherical surface.

11. An assembly as set forth in claim 10 wherein said support means and said rods are movable relative to said attachment means between first and second positions, and including biasing means reacting between said attachment means and said support means for urging the latter to said first position.

12. An assembly as set forth in claim 11 wherein said indicator means includes a first socket means, said input means includes a second socket means, said support means includes an at least partially spherical first element disposed in said first socket means, the spherical surface of said first element having a center coincident with said first point, said support means includes an at least partially spherical second element disposed in said second socket means, the spherical surface of said second element having a center coincident with said second point.

13. An assembly as set forth in claim 12 wherein said support means includes a female member having a spherical concave cavity therein, said indicator means has a spherical surface in sliding engagement with said cavity, said female member has passages therethrough, each of said rods extend through one of said passages and engage said indicator means, said translucent means being attached to said female member.

14. An assembly as set forth in claim 13 wherein said support means further includes a guide member abutting said input means, said biasing means being disposed to react between said attachment means and said guide member.

15. An assembly as set forth in claim 14 wherein said attachment means includes a pair of parallel and spaced first and second flanges, said rods extend through said flanges, said biasing means includes at least one spring engaging a first side of said first flange at one end and extending through said second flange and engaging said guide member at the other end to urge said female member against the second side of said first flange.

16. An assembly as set forth in claim 15 wherein said input means and said guide member are in mating engagement through coacting spherical surfaces.

17. An assembly as set forth in claim 16 wherein said guide member includes an enlarged head portion engaging said input means and an elongated portion extending through said first and second flanges and engaging said female member.

18. An assembly as set forth in claim 17 wherein said spring is disposed about said elongated portion and engages said head portion.

19. An assembly as set forth in claim 18 wherein said support means includes a shaft interconnecting said first and second elements and extending through head and elongated portions of said guide member.

20. An assembly as set forth in claim 19 including positioning means interconnecting said elongated portion of said guide member and said first flange for preventing rotation of said guide member.

21. An assembly as set forth in claim 20 wherein said positioning means comprises a slot extending along said elongated portion of said guide member and a tab extending from said first flange and into said slot.

22. An assembly as set forth in claim 20 wherein said first and second elements are balls and said shaft extends through said balls, said first indicia means comprises a circular groove in said concave spherical surface of said translucent means and said second indicia means comprises a circular groove in said indicator means, said circular grooves being of equal diameter.

23. An assembly as set forth in claim 22 wherein said indicator means has recesses therein for receiving said first ends of said rods.

* * * * *